United States Patent [19]

Seiger

[11] Patent Number: 4,734,342
[45] Date of Patent: Mar. 29, 1988

[54] TERMINAL MEANS FOR ELECTROCHEMICAL CELLS

[75] Inventor: Harvey N. Seiger, Mayfield Heights, Ohio

[73] Assignee: Gould, Inc., Rolling Meadows, Ill.

[21] Appl. No.: 9,033

[22] Filed: Jan. 29, 1987

Related U.S. Application Data

[63] Continuation-in-part of Ser. No. 823,792, Jan. 29, 1986, abandoned.

[51] Int. Cl.⁴ .............................................. H01M 2/30
[52] U.S. Cl. ..................................... 429/152; 429/178
[58] Field of Search ............... 429/152, 153, 154, 155, 429/178, 211, 156, 157, 158, 159

[56] References Cited

U.S. PATENT DOCUMENTS

| | | | |
|---|---|---|---|
| 2,496,709 | 2/1950 | Gelardin | 429/155 |
| 3,488,220 | 1/1970 | Lyall et al. | 429/154 |
| 3,791,871 | 2/1974 | Rowley | 429/118 |
| 3,976,509 | 8/1976 | Tsai et al. | 429/194 |
| 4,007,057 | 2/1977 | Littauer et al. | 429/57 |
| 4,057,675 | 11/1977 | Halberstadt et al. | 429/39 |
| 4,188,462 | 2/1980 | Klootwyk | 429/68 |
| 4,189,528 | 2/1980 | Klootwyk | 429/70 |
| 4,200,685 | 4/1980 | Klootwyk et al. | 429/70 |
| 4,528,249 | 7/1985 | Galbraith | 429/15 |

Primary Examiner—Donald L. Walton
Attorney, Agent, or Firm—Marshall, O'Toole, Gerstein, Murray & Bicknell

[57] ABSTRACT

A terminal pattern is disclosed for an assembly of reactive metal electrochemical cells which includes a plurality of bipolar electrodes arranged in stacked, spaced relationship and connected in series between a pair of spaced conductive end plates. The terminal pattern on each end plate of the assembly includes an array of interconnected terminal segments of high conductive material disposed outwardly of a center point of the respective end plate in a generally uniform pattern with respect to the area configuration of the end plate. The pattern of terminal segments enlarge the terminal area and provide more uniform current distribution and active metal consumption over the areas of the bipolar electrodes.

22 Claims, 8 Drawing Figures

TERMINAL MEANS FOR ELECTROCHEMICAL CELLS

CROSS-REFERENCE TO RELATED APPLICATION

This application is a continuation-in-part of copending, commonly assigned application Ser. No. 823,792 filed Jan. 29, 1986 and now abandoned.

BACKGROUND OF THE INVENTION

1. Field Of The Invention

This invention relates generally to electrochemical cells and, more particularly, this invention relates to terminal means for reactive metal electrochemical cells.

2. Description Of The Prior Art

Electrochemical cells utilizing consumable, reactive metal anodes are well known. Multi-cell assemblies of such electrochemical cells or batteries to which this invention relates normally include a plurality of anodes and cathodes arranged in spaced relation within an overall case. The anodes and cathodes are provided on opposite sides of bipolar plates to define bipolar electrodes connected in series between a pair of spaced end plates which define the ends of the case. An electrolyte is flowed across the spaced faces of adjacent anodes and cathodes. Typically, the anode comprises an alkali metal, such as lithium, in elemental, compound, complex, alloy or mixture form, or alkaline earth metal in conjunction with a cathode typically of a suitable oxidized metal such as iron oxide or silver oxide, and an aqueous or non-aqueous electrolyte. The electrolyte normally comprises an aqueous solution of basic metal hydroxide.

Such cells are described in detail in numerous patents and publications, including U.S. Pat. Nos. 3,791,871 (Rowley); 3,976,509 (Tsai et al); 4,007,057 (Littauer et al); and 4,188,462 (Klootwyk), the details of the respective disclosures being incorporated herein by reference.

Terminal cells are provided on the opposite end plates of the multi-cell assembly, including a cathode terminal and an anode terminal for securing ends of conductors in electrically conducting relation to provide terminal voltage for operation of ancillary equipment. Heretofore, the terminal means conventionally comprise post-like elements which may or may not include threaded nuts, clamps or the like for connecting the ends of conductors to the terminal posts. The terminal posts conventionally are located at the centers of the end plates of the assembly. With the central location of the terminal posts, a current flow pattern through the stacked array of bipolar electrodes will, in a broad sense, be elliptical, with the current flow pattern at the ends of the ellipse being tapered toward the centrally located terminal posts. As a result, there is a non-uniform current distribution across the area of any given bipolar electrode and, consequently, the active metal consumption over the area of the bipolar electrode is not uniform. Specifically, the outer peripheral edges of the bipolar electrodes closer to the end plates of the cells have considerably less active metal consumption than the center areas of those bipolar electrodes. Obviously, this inefficiency has been tolerated for many years.

This invention is directed to solving the problem of non-uniform current distribution throughout a multiple electrochemical cell assembly, along with the non-uniform active metal consumption, by providing novel terminal means at the ends of the assembly.

SUMMARY OF THE INVENTION

An object, therefore, of the invention, is to overcome the problems described above by providing a new and improved assembly of reactive metal electrochemical cells which includes novel terminal means.

In the exemplary embodiment of the invention, an assembly of reactive metal electrochemical cells is disclosed and includes a plurality of bipolar electrodes in a stacked, spaced configuration within an insulating case and connected in series between a pair of spaced end plates of the assembly, the end plates being of metal such as iron. Terminal means are provided on each end plate and include an array of interconnected terminal segment means disposed outwardly of a center point of the respective end plate in a generally uniform pattern with respect to the area configuration of the end plate. Preferably, the terminal means are of copper or the like, and the novel terminal means enlarges the terminal area and provides more uniform current distribution and active metal consumption over the area of the bipolar electrodes.

Specifically, the terminal means include a center connecting terminal portion for connection to appropriate conductors to provide terminal voltage for ancillary equipment. A plurality of outer terminal segment means are arranged in a pattern outwardly of the center connecting terminal portion. Spoke-like terminal segments interconnect the outer segment means to the center connecting terminal portion.

In one form of the invention, the outer terminal segment means comprise a complete, concentric circle about the center connecting terminal portion, with the spoke-like terminal segments emanating outwardly from the center terminal portion and connected to the circular terminal segment means. In another form of the invention, the outer terminal segment means include equally spaced segments of a circle arranged concentrically about the center connecting terminal portion with one spoke-like segment between each outer segment and the center terminal portion. In a further form of the invention, the outer segments are in a polygonal array about the center connecting terminal portion and connected thereto by the spoke-like segments. Of course, a wide variety of terminal configurations are contemplated by this invention for enlarging the effective terminal area at the ends of the electrochemical cell assembly to provide more uniform current distribution and active metal consumption over the area of the bipolar electrodes.

Other objects, features and advantages of the invention will be apparent from the following detailed description taken in connection with the accompanying drawings.

DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

DETAILED DESCRIPTION OF THE PREFERRED EMBODIMENT

As is well known in the art, a reactive metal electrochemical cell generally comprises an anode of a reactive metal, a cathode spaced therefrom, and an electrolyte which contacts at least a portion of the anode and the cathode during operation of the cell. Each of the anode and cathode are connected to a terminal, and the respective terminals are connected to a load during operation.

The anode typically is of an alkali metal such as sodium, for example, and preferably is of lithium. The anodic metal may be present in elemental, compound, complex, alloy or mixture form, as is well known in the art.

The cathode may be of any suitable oxidant, such as iron oxide or silver oxide (AgO), for example, or may be a gas-consuming cathode such as an air cathode.

The anode and the cathode are spaced from each other either by a mechanical separator, or merely by the metallic hydroxide film which invariably forms on the anode by exposure to humid air.

Figure 1:
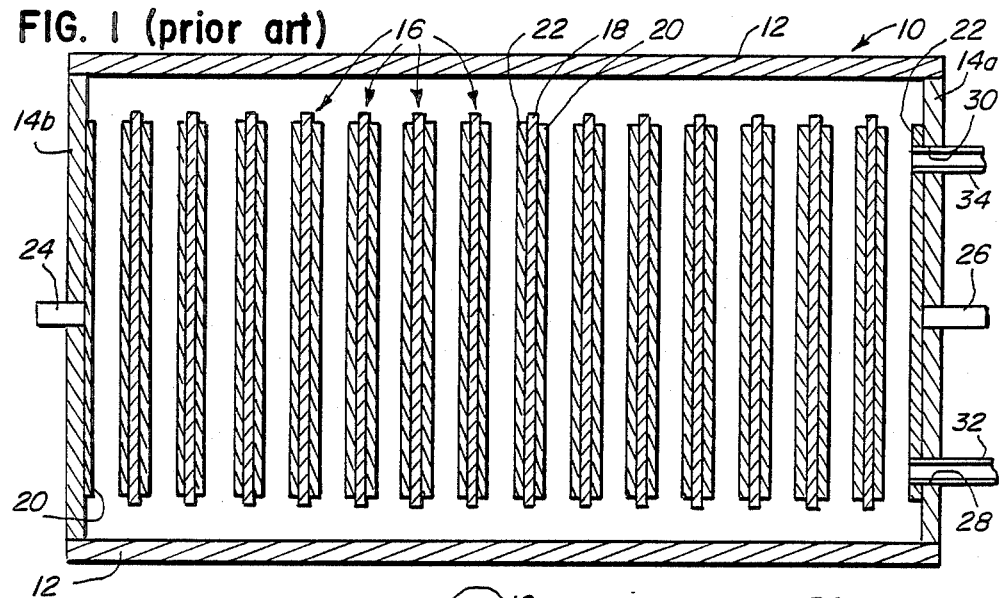
FIG. 1 is a somewhat schematic longitudinal, central section through a conventional electrochemical cell assembly of the prior art.

FIG. 1 shows an assembly of reactive metal electrochemical cells, generally designated 10, in accordance with conventional art. The assembly is generally circular and includes a cylindrical insulating or non-conductive housing 12 and a pair of metal (e.g. iron) end plates 14a and 14b. A plurality of bipolar electrodes, generally designated 16, are arranged in a stacked, spaced relation within the assembly and connected in series between the spaced end plates 14a, 14b.

Each bipolar electrode 16 includes a bipolar plate 18, such as of nickel foil, for example, an anode plate 20, such as of lithium foil, and a cathode plate 22, such as of silver oxide. The anode and cathode are bonded to opposite sides of the bipolar plate. It should be noted that the thickness of the bipolar plates, anode plates and cathode plates are shown in the drawings as of generally equal thickness. This has been done for illustration purposes only, and the thickness of the respective plates or foils normally are not equal in actual practice.

End plate 14b has an anode plate 20 bonded to the inside surface thereof. A terminal post 24, such as of copper or the like, is connected to anode plate 20, through end plate 14b, and comprises the anode terminal.

Similarly, end plate 14a has a cathode plate 22 bonded to the inside surface thereof. A terminal post 26, such as of copper or the like, extends through end plate 14a and is in engagement with cathode plate 22 to comprise the cathode terminal.

End plate 14a also is provided with an inlet passage 28 and a discharge passage 30 for receiving suitable fittings 32 and 34, respectively, to which electrolyte supply and return lines (not shown) may be readily coupled. Furthermore, although not shown in the drawings, terminal posts 24,26 also may include threaded nuts, clamps or other appropriate couplings for connecting the ends of conductors thereto for providing terminal voltage to operate ancillary equipment.

Figure 2:
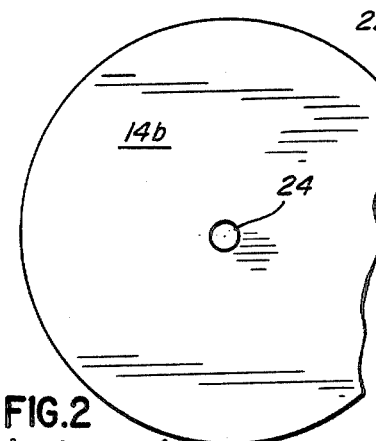
FIG. 2 is an elevational view of the left-hand end plate of the assembly of FIG. 1, illustrating the central location of the terminal post of the prior art.
Figure 7:
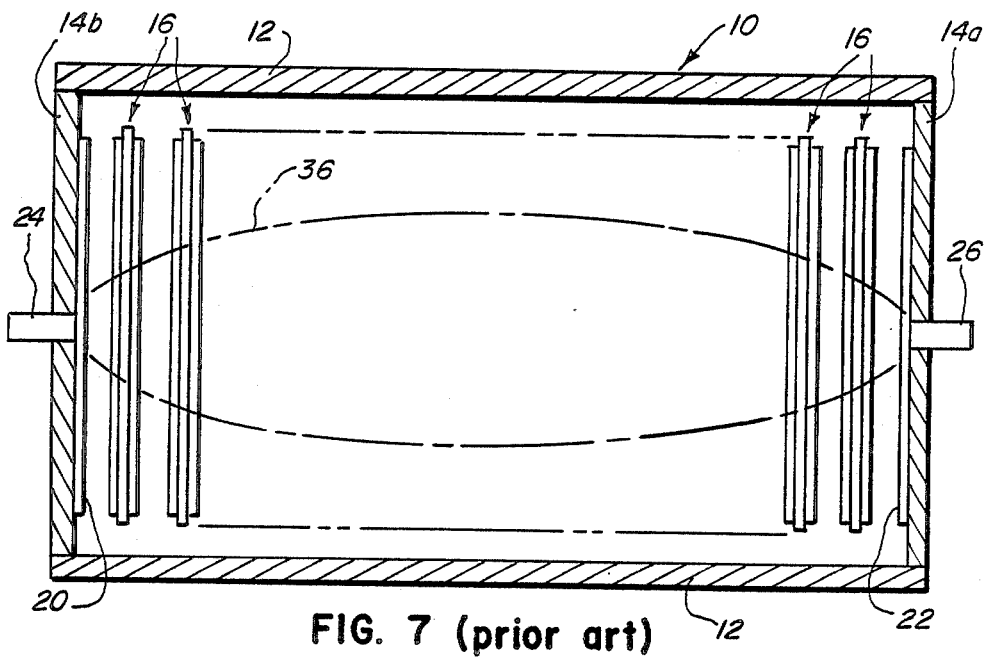
FIG. 7 is a somewhat schematic section of a prior art cell assembly similar to that of FIG. 1, illustrating current distribution.

Referring to FIGS. 2 and 7, in addition to FIG. 1, it can be seen that terminal posts 24,26 conventionally are located centrally of end plates 14b and 14a, respectively, with respect to the area configuration of the end plates. In other words, since end plates 14a, 14b are circular in configuration, the terminal posts are located at the concentric center point of the end plates. With such a structure, a current flow pattern 36 is shown in FIG. 7. In a broad sense, the current flow pattern is generally elliptical, tapering toward terminal posts 24,26. In actual operation of course, current flow paths are more linear between any two bipolar electrodes. This is the natural current flow pattern for such an electrochemical cell or battery fabricated with conventional center terminal posts. It immediately can be seen that bipolar electrodes 16 in FIG. 7, at the ends of the cell, have considerably less current flow distribution therethrough than bipolar electrodes which would be located more centrally of the cell. The result is an uneven or non-uniform current distribution through the cell and, consequently, non-uniform active metal consumption over the areas of the bipolar electrodes. More active metal consumption will occur with the center bipolar electrode than the end bipolar electrodes, particularly about the outer periphery of the end bipolar electrodes.

FIGS. 3-6 and 8 illustrate the new and improved terminal means of the invention for enlarging the terminal area of the electrochemical cell to provide more uniform current distribution and active metal consumption over the areas of the bipolar electrodes. Like numerals are applied in these Figures for like components already described in relation to FIG. 1. Again, housing 12 is non-conductive. Generally, the invention contemplates terminal means on end plates 14a, 14b such as to form a terminal pattern disposed outwardly of a center point of each respective end plate. The end plates are of iron or like conducting material. The terminal means generally comprise an array of interconnected terminal segment means disposed outwardly of a center point of the respective end plate in a generally uniform pattern with respect to the area configuration of the end plate. The terminal means or terminal pattern of terminal segment means are of high conductive material such as copper or the like.

Figure 3:
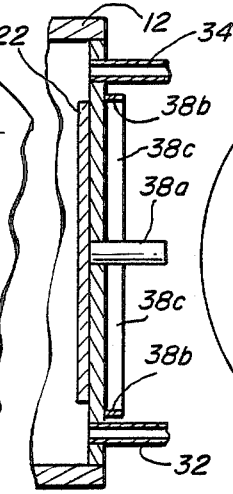
FIG. 3 is a fragmented section through an end plate and terminal means of the invention.
Figure 4:
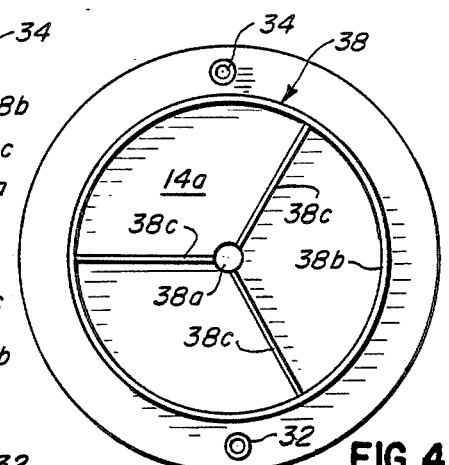
FIG. 4 is an elevational view looking at the right-hand end of FIG. 3, illustrating one configuration of the terminal means.
Figure 5:
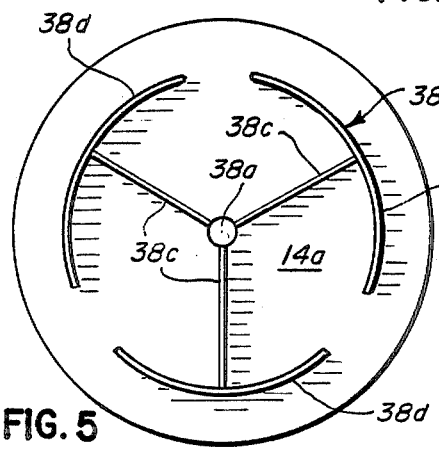
FIG. 5 is a view similar to that of FIG. 4, illustrating another configuration of the terminal means.

More particularly, FIGS. 3-5 show a terminal pattern or an array of interconnected terminal segment means in a generally circular configuration with respect to circular end plates 14a, 14b as described in relation to FIGS. 1 and 2.

Referring first to FIGS. 3 and 4, the terminal means is generally designated 38 and includes a center connecting terminal portion 38a which may form the terminal post for securing an end of a conductor to the terminal means in electrically conducting relation. In the form of the invention shown in FIGS. 3 and 4, the terminal pattern is generally circular and includes an outer terminal segment 38b forming a complete, concentric circle or ring about center connecting terminal portion 38a. A plurality of spoke-like terminal segments 38c radiate outwardly from center connecting terminal post 38a for electrically interconnecting the terminal post to concentric terminal ring 38b.

FIG. 5 shows a variation of the circular configuration of terminal means 38. Similar to FIG. 4, the terminal pattern or array of interconnected terminal segment means is circular in configuration and includes a plurality of equally spaced segments 38d of a circle concentric about center connecting terminal post 38a. The spoke-like terminal segments 38c individually connect circular segments 38b electrically with terminal post 38a.

Figure 6:
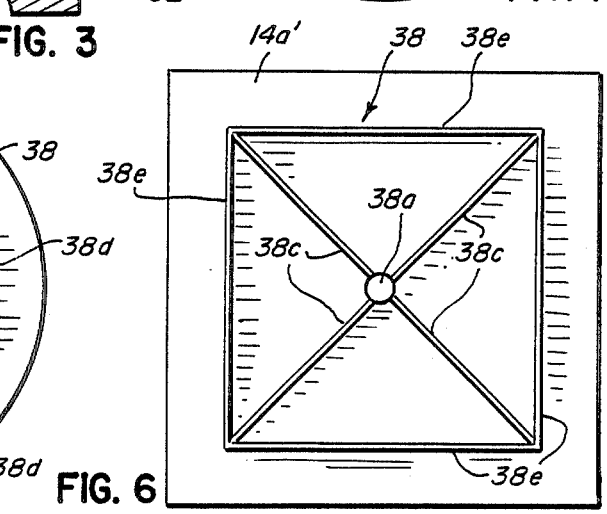
FIG. 6 is a view similar to that of FIGS. 4 and 5, illustrating a square cell end plate and another configuration of the terminal means of the invention.

FIG. 6 shows still another configuration or terminal pattern in accordance with the invention. In this embodiment, the end plate 14a' is polygonal (specifically, square) for an electrochemical cell assembly of similar cross-sectional configuration. In this embodiment, terminal means 38 also is polygonal or square in configuration and, again, includes center connecting terminal post 38a and four spoke-like terminal segments 38c radiating outwardly from the center terminal post. The array of interconnected terminal segment means is completed by four straight terminal segments 38e which are electrically connected to center terminal post 38a by spoke-like terminal segments 38c. The array may also be circular, in which case if the square has an edge length L, the circle has a radius $r=0.4L$.

It should be understood that the circular terminal patterns or arrays of terminal segments illustrated in FIGS. 4 and 5, as well as the polygonal or square terminal pattern or array of interconnected terminal segments in FIG. 6, are exemplary. Other patterns, arrays or configurations are contemplated by the invention.

Figure 8:
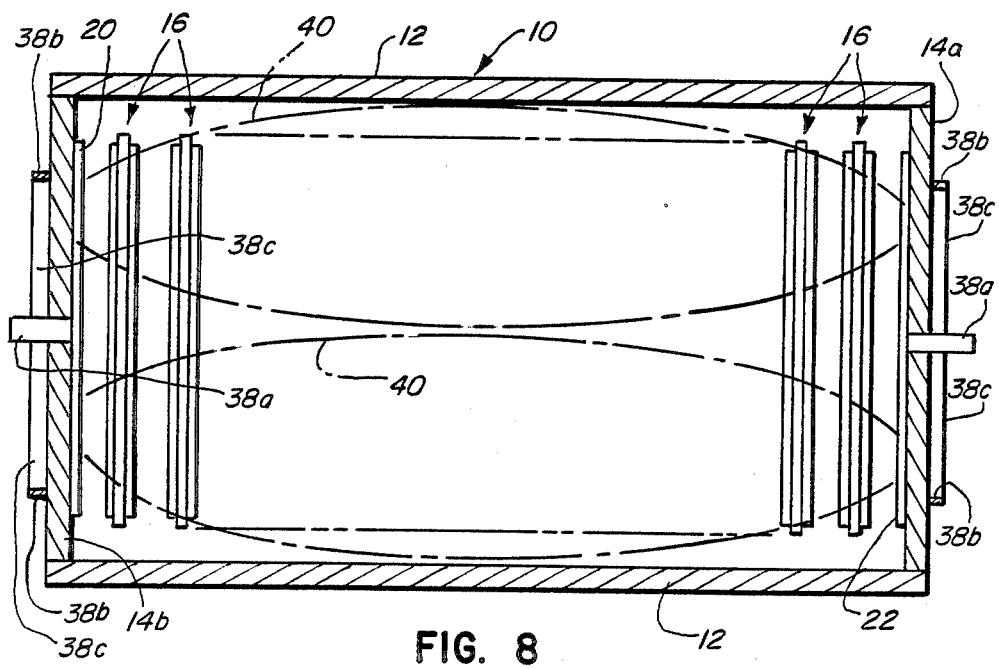
FIG. 8 is a view similar to that of FIG. 7, illustrating the current distribution with terminal means according to the invention.

As will be better understood in relation to FIG. 8, it has been found that there is a relationship between the area of the respective end plate 14a, 14b bounded by the terminal pattern with respect to the area of the end plate outside the terminal pattern. Preferably, the area bounded by the terminal pattern should be approximately equal to the area of the end plate outside the terminal pattern. For instance, referring to FIGS. 4 and 5, the area within circular terminal ring 38b (FIG. 4) or within circular terminal segments 38d (FIG. 5) should be approximately equal to the area of the respective end plate outside either circular pattern. Mathematically, the radius of the circular pattern of terminal segments is on the order of 0.70 the radius of the end plate itself. Similarly, with respect to the polygonal or square pattern in FIG. 6, the area bounded by straight terminal segments 38e should be approximately equal to the area of the end plate outside terminal segments 38e. This relationship has proven most efficient to provide the most uniform current distribution and active metal consumption over the areas of the bipolar electrodes throughout the length of the electrochemical cell assembly.

The results of such terminal patterns as described above in accordance with the concepts of this invention are illustrated somewhat schematically in FIG. 8. It has been shown that a terminal pattern such as terminal means 38 in FIGS. 3–6 provide a much larger and more uniform current distribution throughout the electrochemical cell assembly. It is believed that the current distribution pattern approaches a pair of ellipses 40 as illustrated in FIG. 8. Again, the elliptical shapes are used for illustration purposes, it being known that current paths are more linear. It immediately can be seen that the area of the bipolar plates are covered to a much greater extent by the current distribution pattern shown in FIG. 8 than the conventional current flow pattern shown in FIG. 7, particularly with the bipolar electrodes located toward the center of the cell. With such a current distribution, a much more uniform active metal consumption takes place over the areas of the bipolar electrodes than in prior art or conventional electrochemical cells.

In facilitating an appreciation of the improvements afforded by the invention, a distinction between electrochemical systems and electrical systems must be understood. Whereas in an electrical circuit current flows predominantly through the least resistive path, an electrochemical circuit requires a charge transfer across a solid/liquid interface. This charge transfer can occur only where a chemical is present that can undergo a valence change by oxidation or reduction.

In the case of an anode such as lithium, the electrochemical reaction is $Li=Li(+)+e(-)$. In considering the end electrode of the electrochemical cell that is connected to the negative terminal, the Li metal, upon oxidation, strips an electron creating the charged pair; electron and $Li(+)$ ion. The $Li(+)$ ion transfers to the electrolyte while the electron moves toward the external terminal. The exact path is governed by both the location of the Li atom in the solid electrode as well as the path of least resistance.

Therefore, in comparing prior art designs such as in FIGS. 1, 2 and 7, the Li atoms closest to the center terminal will discharge first. As the discharging continues, the resistance path increases until ultimately becoming the radius (in a circularly configured cell). In the specific embodiment of the invention where the terminal means configuration conforms generally to the electrode such that approximately one-half of the Li atoms are located inside the bounds of the terminal means and approximately one-half of the atoms are located outside the terminal means, the longest path will be on the order of 0.7 times the radius. Therefore, it follows that the voltage drop is decreased, the current density is more uniform and the discharge curve will be flatter where the discharge curve is defined as voltage versus time at constant current.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

I claim:

1. In an assembly of reactive metal electrochemical cells which includes a plurality of bipolar electrodes connected in series between a pair of spaced conductive end plates, terminal means of higher conductive material than said end plates on each said end plate comprising an array of interconnected termnial segment means disposed outwardly of a center point of the respective end plate in a generally uniform pattern with respect to the area configuration of the end plate to thereby enlarge the terminal area and to provide more uniform current distribution and active metal consumption over the areas of the bipolar electrodes.

2. In a reactive metal electrochemical cell assembly as set forth in claim 1, wherein said terminal means include a center connecting terminal portion.

3. In a reactive metal electrochemical cell assembly as set forth in claim 2, wherein said interconnected terminal segment means include a plurality of outer segments spaced outwardly of the center connecting terminal portion.

4. In a reactive metal electrochemical cell assembly as set forth in claim 3, including spoke-like terminal segments interconnecting the outer segments to the center connecting terminal portion.

5. In a reactive metal electrochemical cell assembly as set forth in claim 3 or 4, wherein the outer segments are in a circular array.

6. In a reactive metal electrochemical cell assembly as set forth in claim 5, wherein the outer segments form a complete, concentric circle about the center connecting terminal portion.

7. In a reactive metal electrochemical cell assembly as set forth in claim 5, wherein the outer segments comprise equally spaced segments of a circle concentric about the center connecting terminal portion with one of said spoke-like segments between each outer segment and the center connecting terminal portion.

8. In a reactive metal electrochemical cell assembly as set forth in claim 3 or 4, wherein the outer segments are in a polygonal array about the center connecting terminal portion.

9. In a reactive metal electrochemical cell assembly as set forth in claim 8, wherein each side segment of the polygonal array is connected by one of said spoke-like segments to the center connecting terminal portion.

10. In a reactive metal electrochemical cell assembly as set forth in claim 1, wherein said array of terminal segment means include outer segments arranged in a circular pattern about said center point.

11. In a reactive metal electrochemical cell assembly as set forth in claim 1, wherein said array of terminal segment means include outer segments arranged in a polygonal pattern about said center point.

12. In a reactive metal electrochemical cell assembly as set forth in claim 1, wherein said interconnected terminal segment means include an array of outer segments spaced outwardly of said center point.

13. In a reactive metal electrochemical cell assembly as set forth in claim 10, 11 or 12, wherein the area of the respective end plate bounded by said array of outer segments is substantially equal to the area of the end plate outside the bounds of the outer terminal segment means.

14. In a reactive metal electrochemical cell assembly as set forth in claim 10, 11 or 12, wherein the outer segments are spaced outwardly of the center point on the order of 0.70 the distance from the center point to the periphery of the respective end plate.

15. In a reactive metal electrochemical cell assembly as set forth in claim 1, wherein the area bounded by said terminal segment means is equal to the area of the respective end plate outside the bounds of the terminal segment means.

16. In an assembly of reactive metal electrochemical cells which include a plurality of bipolar electrodes connected in series between a pair of conductive end plates, terminal means of higher conductive material than said end plates on each said end plate comprising a center connecting terminal portion, an array of outer terminal segment means disposed outwardly of the center terminal portion, and spoke-like terminal segments interconnecting the outer terminal segment means to the center terminal portion, the area of the respective end plate bounded by the array of outer terminal segment means being substantially equal to the area of the end plate outside the bounds of the outer terminal segment means.

17. In a reactive metal electrochemical cell assembly as set forth in claim 16, wherein said array of outer terminal segment means is arranged in a circular pattern about the center terminal portion.

18. In a reactive metal electrochemical cell assembly as set forth in claim 16, wherein said array of outer terminal segment means is arranged in a polygonal pattern about the center terminal portion.

19. Terminal means on at least one conductive end plate of an assembly of reactive metal electrochemical cells, comprising a terminal pattern of higher conductive material than said end plate disposed outwardly of a center point of the end plate, the pattern being generally uniform with respect to the area configuration of the end plate, whereby the terminal area is enlarged and more uniform current distribution and active metal consumption over the electrochemical cell electrodes are provided.

20. The terminal means of claim 19 wherein the configuration of said terminal pattern is generally circular.

21. The terminal means of claim 19 wherein the configuration of said terminal pattern is generally polygonal.

22. The terminal means of claims 19, 20 or 21 wherein the area of the end plate bounded by said terminal pattern is generally equal to the area of the end plate outside the pattern.

* * * * *